US008930490B2

(12) United States Patent
Brown et al.

(10) Patent No.: US 8,930,490 B2
(45) Date of Patent: Jan. 6, 2015

(54) LIFESTREAM ANNOTATION METHOD AND SYSTEM

(75) Inventors: Stephen J. Brown, Woodside, CA (US); Andreas Schobel, San Francisco, CA (US)

(73) Assignee: Apple Inc., Cupertino, CA (US)

(*) Notice: Subject to any disclaimer, the term of this patent is extended or adjusted under 35 U.S.C. 154(b) by 567 days.

(21) Appl. No.: 13/345,023

(22) Filed: Jan. 6, 2012

(65) Prior Publication Data

US 2012/0110082 A1    May 3, 2012

Related U.S. Application Data

(63) Continuation-in-part of application No. 12/322,046, filed on Jan. 27, 2009, now Pat. No. 8,200,757.

(60) Provisional application No. 61/460,813, filed on Jan. 7, 2011.

(51) Int. Cl.
    G06F 15/16     (2006.01)
    G06F 17/30     (2006.01)

(52) U.S. Cl.
    CPC ............................. *G06F 17/30731* (2013.01)
    USPC ........................................................ 709/217

(58) Field of Classification Search
    USPC .......................................... 709/204, 217, 219
    See application file for complete search history.

(56) References Cited

U.S. PATENT DOCUMENTS

| 6,192,165 | B1 | 2/2001 | Irons |
| 7,308,254 | B1 | 12/2007 | Rissanen |
| 7,499,567 | B2 | 3/2009 | Shimosato |
| 2002/0099552 | A1* | 7/2002 | Rubin et al. .................. 704/270 |
| 2005/0108686 | A1 | 5/2005 | White |
| 2006/0206564 | A1 | 9/2006 | Burns et al. |
| 2007/0118802 | A1 | 5/2007 | Gerace et al. |
| 2007/0245229 | A1* | 10/2007 | Siedzik et al. ................ 715/512 |
| 2007/0245304 | A1 | 10/2007 | Curran |
| 2007/0298399 | A1 | 12/2007 | Shao et al. |
| 2008/0021976 | A1 | 1/2008 | Chen et al. |
| 2008/0034056 | A1 | 2/2008 | Renger et al. |
| 2008/0056574 | A1 | 3/2008 | Heck |
| 2009/0006547 | A1 | 1/2009 | Banatwala |

* cited by examiner

*Primary Examiner* — Jason Recek
(74) *Attorney, Agent, or Firm* — Novak Druce Connolly Bove + Quigg LLP

(57) ABSTRACT

A method and system for collecting information, enriching the collected information and linking the enriched information is provided. The system includes an application server that is accessible by users via their computer device for performing a variety of functions encompassed in a lifestream data function. Lifestreams (or lifestream data) contains notes, recordings and annotation data elements. The goal of the lifestream data functions is to ultimately enrich the individual data elements in each lifestream which then form a network of enriched lifestreams or aspects of enriched lifestreams to provide a user with: (a) a better organization of his/her data, notes, thoughts and intentions, (b) a better search or filter tool to search for data, notes, thoughts and intentions, and/or (c) a better ranking mechanism for ranking or determining relevance of data, notes, thoughts and intentions.

20 Claims, 17 Drawing Sheets

LIFESTREAM ANNOTATION METHOD AND SYSTEM

CROSS-REFERENCE TO RELATED APPLICATIONS

This application claims priority from U.S. Provisional Patent Application 61/460,813 filed Jan. 7, 2011, which is incorporated herein by reference. This application is a continuation-in-part of U.S. patent application Ser. No. 12/322,046 filed Jan. 27, 2009 now U.S. Pat. No. 8,200,757, which is incorporated herein by reference.

FIELD OF THE INVENTION

The invention relates generally to online social media. More particularly, the present invention relates to collecting and enriching information.

BACKGROUND

Today, a tremendous number of online services and applications are available. The existing online services are related to virtually every aspect of life, including work, relationships, health, entertainment, news, etc. Access to these online services typically only requires an Internet connection. However, the abundance of services also causes information overload. As a result, disorganized information is floating around many users' lives and brains. Instead of positively influencing our lives, the services become cumbersome and are often neglected. In particular, the advent of social media has made it easier to share information with more people and make connections with people who we otherwise would not. However, the ubiquity of social media (such as through social networks) has created a further explosion in the information content of our lives and relationships. This information clutter reduces a user's productivity and shortens the user's attention span.

Typically, ideas begin with private thoughts that are later refined and shared to friends and, perhaps, the public at large. Who these ideas are to be shared with often evolve over time. Existing online services are not amenable to this process of developing ideas and deciding where to share them at a later time. For example, existing social media forces ideas immediately into the public domain. Information or media posted on social networks (e.g. Facebook.com, Twitter.com, and Flickr.com) or blogs (e.g. Wordpress.com and Blogger.com) are immediately accessible by other users. To post information in existing social media requires upfront cognitive decision-making related to the audience level of the information at the time the information was collected or generated. This process does not match the way human brains function.

Systems, such as emailing to oneself and note-taking applications (e.g. Evernote.com) exist for users to store private thoughts. However, these existing systems are not integrated with other services or applications. In other words, a user would have to access and sign on to multiple applications simultaneously to utilize information stored in the application storing the private thoughts. Because of the lack of integration and inconvenience of these systems, they are seldom used, therefore, ideas are often forgotten. In addition, existing note-taking applications require users to provide all of the information content to the note. By forcing a user to provide all of the information content, the note-taking process is typically tedious, error-prone, and incomplete.

The present invention addresses at least the above-described difficult problems and advances the art with a semantic note taking system and method.

SUMMARY OF THE INVENTION

The present invention is directed to a semantic note taking system and method for collecting information, enriching the information, and binding the information to services. A plurality of users are communicatively connected to an application server to create one or more notes that can be bound to one or more of a plurality of services and stored in a database. The application server operates a plurality of functions, including a note taking function for allowing each of the users to create one or more notes, a categorizing function for labeling each of the notes with one or more changeable categories, a context function for associating one or more context traits with each of the notes, a binding function to establish one or more changeable binding rules for each of the notes, wherein the binding rules determine one or more of the services where the note is to be bound, and wherein the binding rules are related to the content of the note, the categories of the note, the context traits of the note, a user binding selection, or any combination thereof, and a communication function for communicating each of the notes to one or more of the services where the note is to be bound.

A note includes text, audio media, visual media, audio-visual media, recorded data, a weblink, a pointer to an information source, or any combination thereof. In an embodiment, one or more of the context traits associated with the note includes a time, a location, physical data relating to the user device used to generate the note, or any combination thereof. In another embodiment, relevant data is derived based on one or more of the context traits and the relevant data is attached to the note. The relevant data can be derived by matching one or more of the context traits with data from an information module such as a calendar, an address book, a contact list, a user profile, a user history, or any combination thereof. In an embodiment, one or more of the context traits associated with the note is based on one or more categories of the note, the content of the note, a user history, or any combination thereof.

In a preferred embodiment, the binding rules include one or more publication properties, such as an audience level for the note and/or one or more locations to publish the note. The locations to publish the note can include a private domain of the user, one or more friends of the user, one or more computer-implemented social networks, a blog, an online discussion board, a website, or any combination thereof. In an embodiment, the binding rules are automatically determined based at least partially on one or more of the categories, one or more context traits, the note content, a user history, or any combination thereof.

The application server of an embodiment of the present invention operates a suggestion function for suggesting one or more services, binding rules, and/or categories. The suggestions can be based at least partially on one or more the categories, one or more of the context traits, the note content, a user history, one or more binding rules, or any combination thereof. In an embodiment, a note is automatically bound to one of the suggested services. Preferably, the suggestion function uses a user history of selections of services and/or categories.

In an embodiment of the present invention, a user interface is provided to allow user entry of the categories and binding rules for a note, wherein the user interface includes a first symbol associated with the categories of the note and a second symbol associated with the binding rules of the note. Preferably, the user entry of the first symbol triggers a display of one or more of the categories suggested to the user and selectable by the user. Similarly, the user entry of the second symbol triggers a display of one or more of the binding rules suggested to the user and selectable by the user. In another embodiment, a user interface corresponding to each of the services where a note can be bound is provided. Each of the service-specific user interfaces includes one or more buttons for initiating an action for the service corresponding to the user interface. Preferably, a single click of one of the buttons initiates creation of the note, automatic addition of content to the note, automatic labeling of the note with categories, and communication of the note to the service corresponding to the user interface.

In an embodiment, the user device operated by users to access the application server is a mobile device that communicates with the application server over a wireless network. The services where a note can be bound are selected from the group consisting of a website, a web application, a computer-implemented social network, a blog, a review website, a product review website, an entertainment website, a health application, a medical application, an online retailer, an email application, a research application, a clinical application, a calendar, and an address book.

In an alternate embodiment a method and system is provided for collecting information, enriching the collected information and linking the enriched information. The system includes an application server that is accessible by a plurality of users each with their own computer device for performing a variety of functions encompassed in a so-called lifestream data function. Lifestreams (or lifestream data) contains notes $N_1, N_2 \ldots N_N$, recordings $R_1, R_2 \ldots R_M$ or segments of recordings $R_{S1}, R_{S2} \ldots R_{SM}$ and annotation data elements $A_1, A_2 \ldots A_P$, or any combination thereof. The goal of the lifestream data functions is to ultimately enrich the individual data elements in each lifestream which then form a network of enriched lifestreams or aspects of enriched lifestreams to provide a user with: (a) a better organization of his/her data, notes, thoughts and intentions, (b) a better search or filter tool to search for data, notes, thoughts and intentions, and/or (c) a better ranking mechanism for ranking or determining relevance of data, notes, thoughts and intentions.

BRIEF DESCRIPTION OF THE FIGURES

The present invention together with its objectives and advantages will be understood by reading the following description in conjunction with the drawings, in which.

DETAILED DESCRIPTION OF THE INVENTION

The abundance of online services provides users with opportunities to perform many tasks and connect with numerous people from nearly any location. However, the large number of services often cause information overload and a user cannot efficiently organize the explosion of information content concerning the user's life, work, and relationships. The present invention is directed to a semantic note taking system and method to collect, enrich, and bind information to services. Semantic note taking allows users to effortless off-load information from private thought streams for later determination of where to bind these thoughts. In addition, semantic note taking minimizes the friction to record and share ideas by automatically enriching the note and reducing unnecessary user input. In other words, the present invention is directed to a system and method to collect unscripted data, add more meaning and use out of the data, and bind the data to services.

Figure 1:
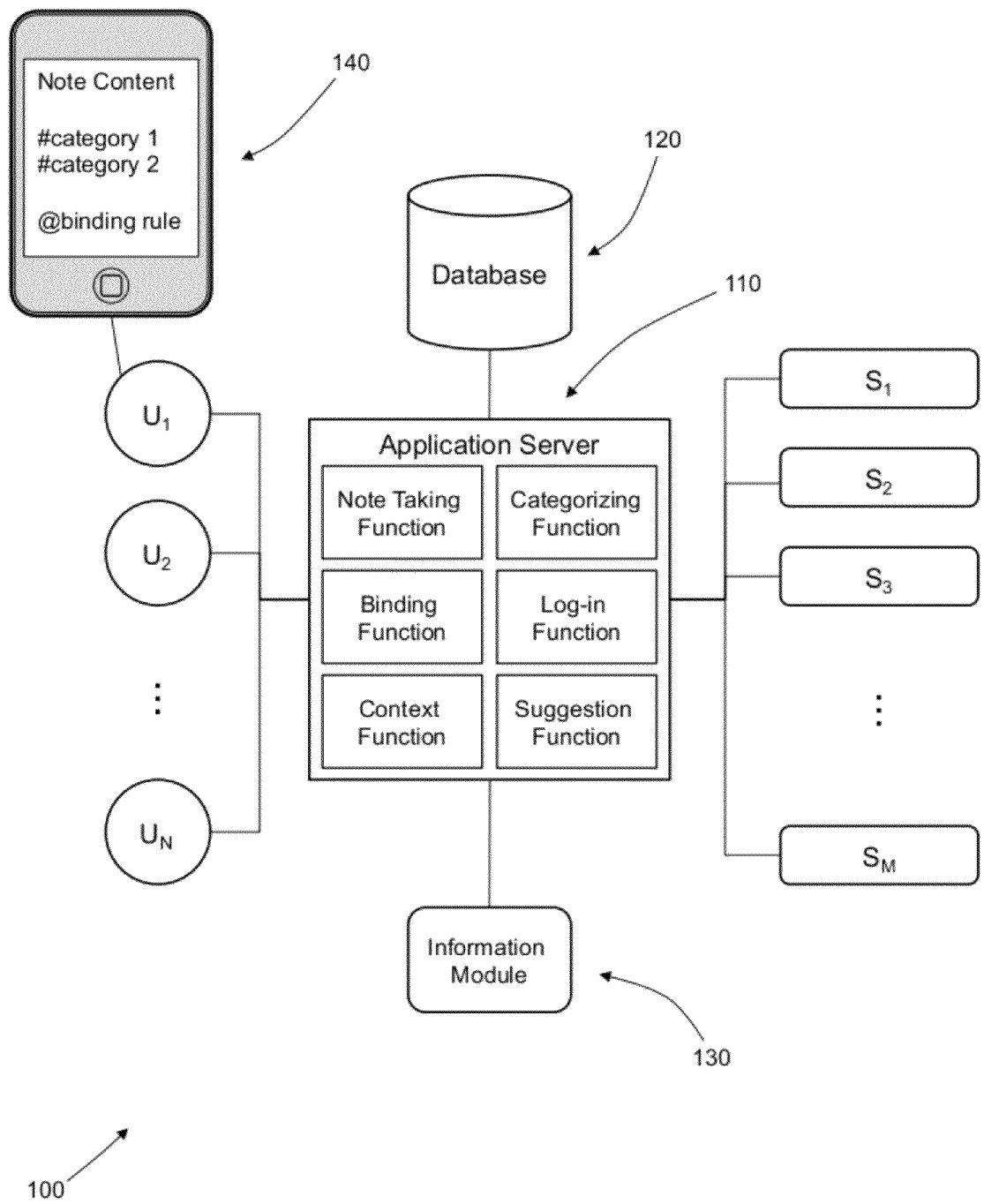
FIG. 1 shows an example of a semantic note taking system according to the present invention.

FIG. 1 shows a preferred embodiment of a semantic note taking system 100 according to the present invention. The semantic note taking system 100 includes an application server 110 that is accessible by a plurality of users $U_1$-$U_N$ for creating one or more notes, categorizing the notes, and binding the notes to one or more services $S_1$-$S_M$. The users $U_1$-$U_N$ connect to the application server 110 through any device capable of being communicatively connected to a network, such as the Internet. The user devices can include a computer, a laptop, a personal digital assistant (PDA), a cell phone, a mobile device, or a smart phone. FIG. 1 shows user $U_1$ with a mobile phone 140 that is connected to the application server 110, such as through a wireless network.

A note taking function, operated by the application server 110, allows each of the users $U_1$-$U_N$ to create one or more notes. Notes can include text, audio media, visual media, audio-visual media, recorded data, a weblink, a pointer to an information source (e.g. a bookmark), or any other type of data. Notes created by the users $U_1$-$U_N$ are transmitted from the user devices to the application server 110 and stored in the database 120 for later binding to one or more of the services $S_1$-$S_M$.

The application server 110 also operates a categorizing function to label the notes with one or more categories. In an embodiment, the categorizing function allows users $U_1$-$U_N$ to label the notes, though automatic or suggested note labeling is also possible. It is noted that one or more of the categories of each note is changeable. Labeling a note with categories enriches the note. The note is further enriched by the context function operated by the application server 110, which associates one or more context traits with the note. Context traits associated with a note can be based on one or more of the categories of the note, the content of the note, a user history, or any combination thereof. Examples of context traits include a time, a location, and physical data relating to the user device. For example, the mobile phone 140 of user $U_1$ is capable of measuring the location where the note was created (e.g. by using GPS measurements) and this location can be automatically associated with the note without user input, thereby enriching the note.

Context information is not restricted to a time-stamp or location-stamp associated with the note. In a preferred embodiment of the present invention, relevant data is derived based on one or more of the context traits. Relevant data can be derived by matching one or more of the context traits with data from an information module 130, such as a calendar, an address book, a contact list, a user profile, a user history, or any combination thereof. For example, a time context trait when the note is created is matched with a meeting time indicated by a calendar information module. Because the calendar includes relevant data, e.g. the participants of the meeting and the discussion topics of the meeting, this relevant data can be attached to the note to further enrich the note.

A binding function is provided to establish one or more binding rules for a note. The binding rules determine one or more services $S_1$-$S_M$ or applications where the note is to be bound. The binding rules are related to the content of the note, the categories of the note, the context traits of the note, a user binding selection, or any combination thereof. In an embodiment, the binding rules of a note are automatically determined based at least partially on one or more categories of the note, one or more context traits, the content of the note, the user history, or any combination thereof.

The services $S_1$-$S_M$ where a note can be bound can include a website, a web application, a computer-implemented social network, a blog, a review website, a product review website, an entertainment website, a health application, a medical application, an online retailer, an email application, a research application, a clinical application, a calendar, an address book, or any combination thereof. A note that is bound to a service is communicated to the service. What is done with the note after it is communicated depends on the particular functions of the service and the content of the note. For example, a note bound to a blog could be published on the blog and a note bound to a research application can include data for analysis by the research application. In addition to communicating a note to a service, in an embodiment of the present invention, data can be extracted from the service where the note is bound and the extracted data is added to the note.

The services $S_1$-$S_M$ shown in FIG. 1 are generally not integrated and some of the services $S_1$-$S_M$ where a note can be bound may also require user login or authentication. To facilitate the integration of the services and allow access to the services, in an embodiment, the application server 110 includes a login function to provide login information for access to the services. Integration of the services enables a user to collect or create information content and offload the content to a single location, instead of having to interact with a myriad of different services separately.

Figure 2:
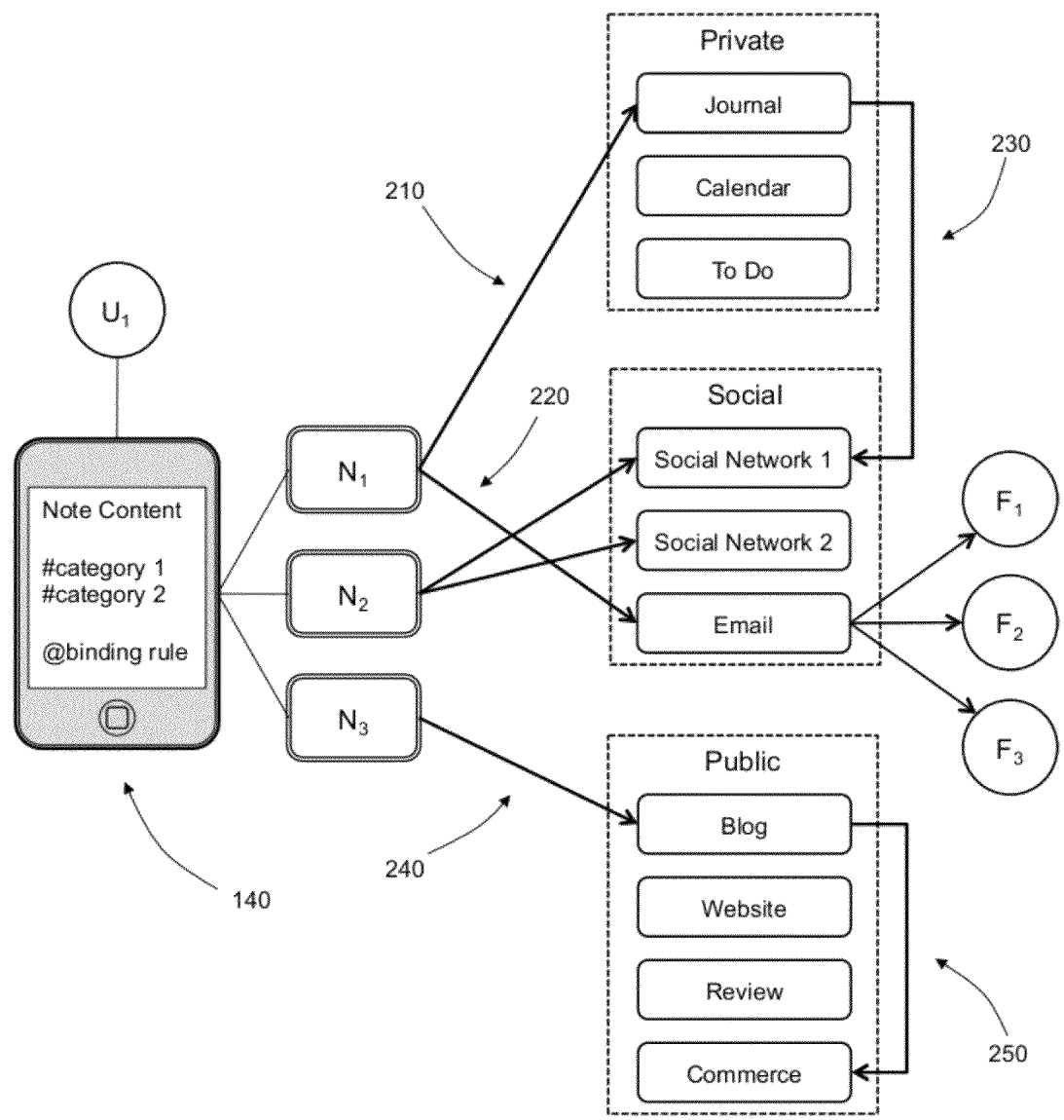
FIG. 2 shows an example of mutable binding of notes to multiple services according to the present invention.

In a preferred embodiment of the present invention, the binding rules comprise one or more publication properties. The publication properties include an audience or privacy level for the note and the location to publish the note. FIG. 2 shows three notes $N_1$, $N_2$, and $N_3$ created by user $U_1$ and the binding of these notes to different services. The audience levels generally include private, social, and public designations. The locations to publish the note includes a private domain of the user, one or more friends $F_1$-$F_3$ of the user, one or more computer-implemented social networks, a blog, an online discussion board, a website, or any combination thereof. FIG. 2 shows note $N_1$ bound 210 to a private journal and bound 220 to an email application. In other words, the binding rules for note $N_1$ indicate that the note should be communicated to the journal service and the email application with the appropriate audience levels.

A note can be bound to any number of services at any time. Importantly, the binding of the note is changeable. In other words, a user can change the binding rules to alter the location where a note is to be bound. In FIG. 2, note $N_1$ is originally bound 210 to a journal but is later bound 230 to Social Network 1. Similarly, note $N_3$ is originally bound 240 to a blog, but is later bound 250 to an electronic commerce website. The mutable binding rules and late-binding method of the present invention is in accord with how ideas are typically generated in our brains. In particular, ideas and information typically start as private thoughts that are later shared and discussed with people we know. Finally, the information is published to the world. This is in contrast to existing social media where generated media are forced immediately into the public realm.

FIG. 2 also shows note $N_1$ published and communicated to associates or friends $F_1$-$F_3$ of user $U_1$. By publishing note $N_1$ to friends $F_1$-$F_3$, an ad hoc community or an ad hoc social network is developed around note $N_1$. In an embodiment, one or more of the friends $F_1$-$F_3$ can change the note $N_1$. In particular, data can be extracted from one of the friends $F_1$-$F_3$ and the extracted data is added to the note $N_1$.

Figure 3:
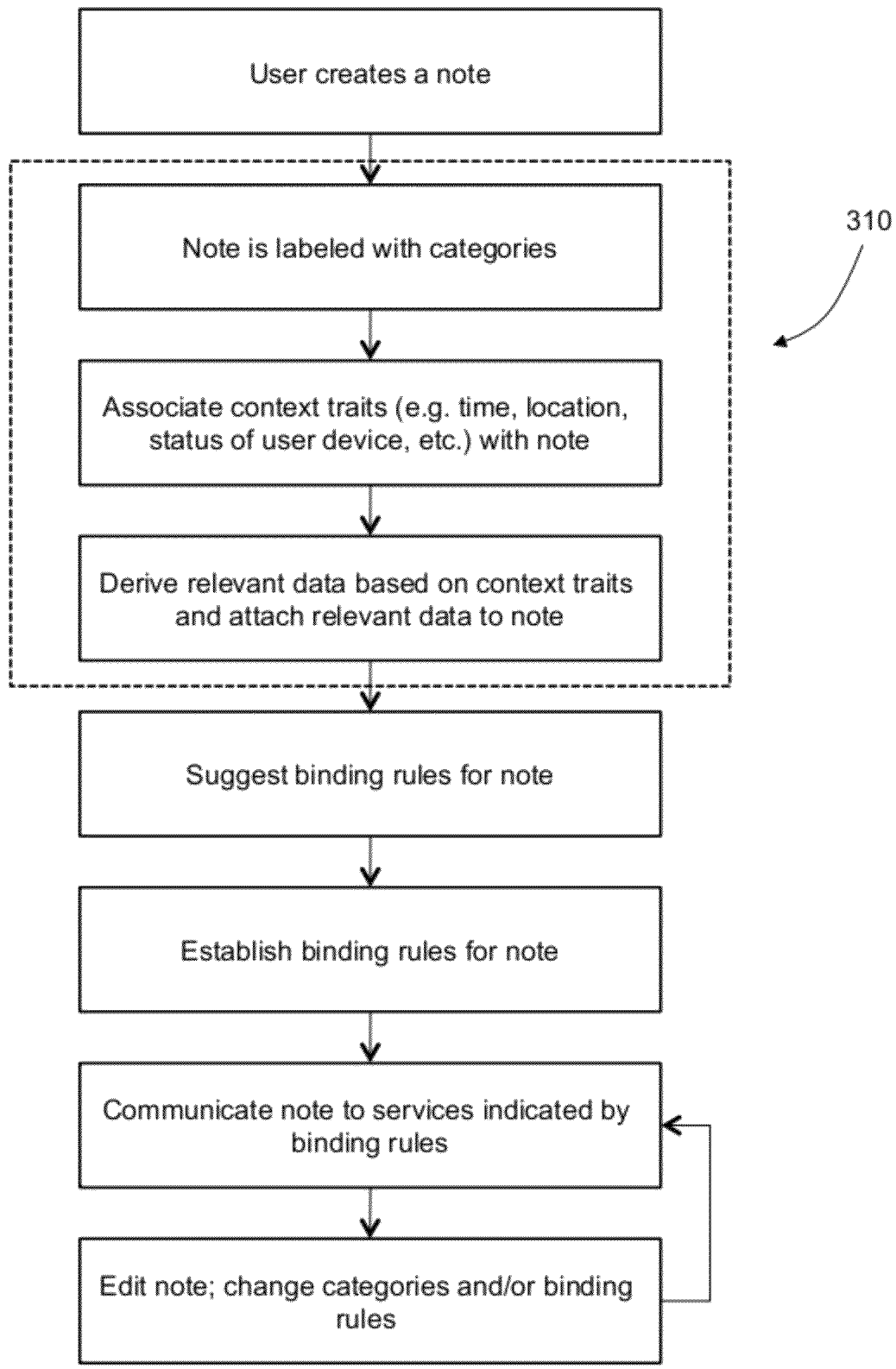
FIG. 3 shows a flow chart of an example note creation, enrichment, and binding according to the present invention.
Figure 4:
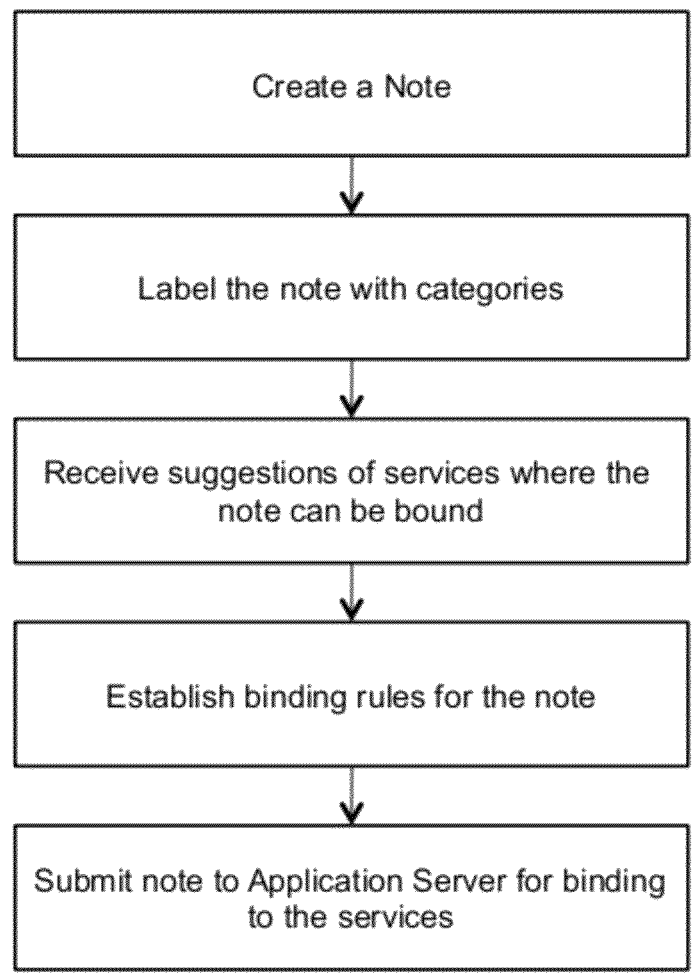
FIG. 4 shows a flow chart of example steps taken by a user according to the present invention.

FIGS. 3 and 4 show flow charts for exemplary methods of creating, enriching, and binding the notes according to the present invention. The steps circled with a dashed line 310 in FIG. 3 show the enrichment of the notes by labeling the note with categories, associating context traits with the note, and deriving relevant data based on the context traits. FIG. 4 shows the steps undertaken by a user of the semantic note taking system of the present invention.

Figure 5:
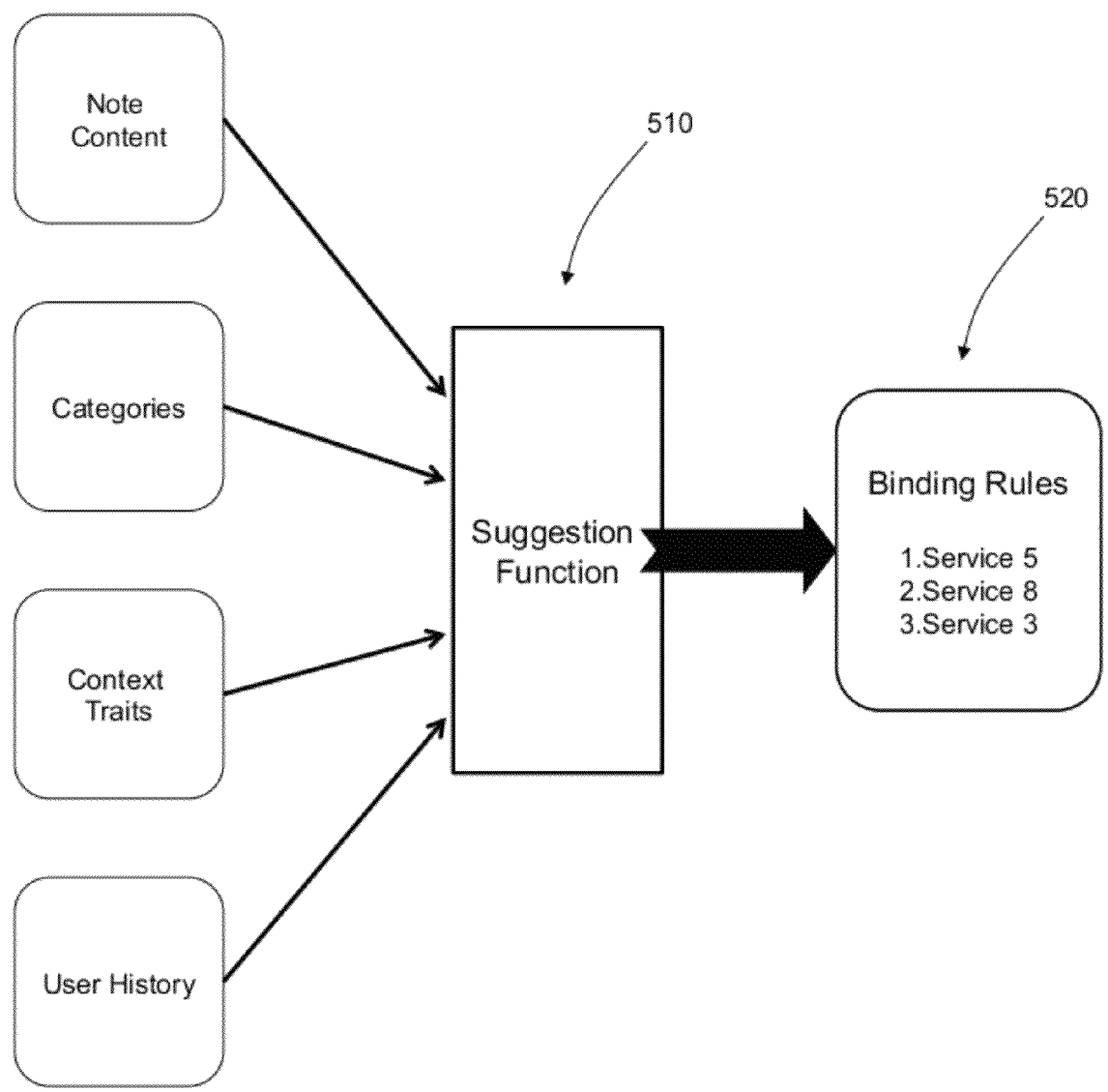
FIG. 5 shows an example of a suggestion function according to the present invention.

FIGS. 3 and 4 also include the steps of suggesting binding rules and receiving suggestions, respectively. The application server operates a suggestion function for suggesting one or more services where the note can be bound to the user who created the note. FIG. 5 shows the inputs for the suggestion function 510, which can include the content of the note, the categories of the note, the context traits, and/or the user history. Based on these inputs, the suggestion function 510 suggests binding rules 520, such as a list of suggested services where the note can be bound. For example, FIG. 5 shows a ranked list of services with "Service 5" being the top-ranked service where the note can be bound.

In an embodiment, the suggested services or binding rules are selectable by the user, where the user selection binds the note to the selected service. User selections can be stored for reference by the suggestion function. For example, a first note is created by a user, labeled with "Category 4", and bound to "Service 5" by user selection. Because of this user selection, "Service 5" would be suggested for a second note also labeled with "Category 4". It is noted that the first and second notes can be created by the same user, or they can be created by different users. In other words, the suggestion function 510 can rely on the user history of the same user or the user history of a community of users. It is noted that the association of a service to a category is mutable and evolvable depending on user behavior. For example, though "Category 4" and "Service 5" are associated in the above example, the association of services for "Category 4" could change to "Service 3" if users frequently alter the selection from "Service 5" to "Service 3" for notes having a label of "Category 4".

In an embodiment, a note is automatically bound to one of the suggested services without user selection. In a preferred embodiment, the storage of past user selections enables intelligent and automatic binding of notes to services. Automatic binding of notes to services reduces the need for user input.

The suggestion function 510 is also capable of suggesting categories to label a note in addition to or replacement of suggesting binding rules. Suggestions of categories can be analogous to the suggestions of services described in the previous paragraphs. In particular, suggestions of categories can be based on the content of the note, the context traits of the note, other categories of the note, a user history, the binding rules established for the note, the services determined by the binding rules, or any combination thereof. For example, a note contains a description of a product. Based on this note content, a category named "product" is suggested to the user for labeling the note. In another example, the association of a service and a category based on a user history can be used to suggest one or more categories for notes having binding rules with that particular service. In an embodiment, a note is automatically labeled with one or more suggested categories.

Figure 6:
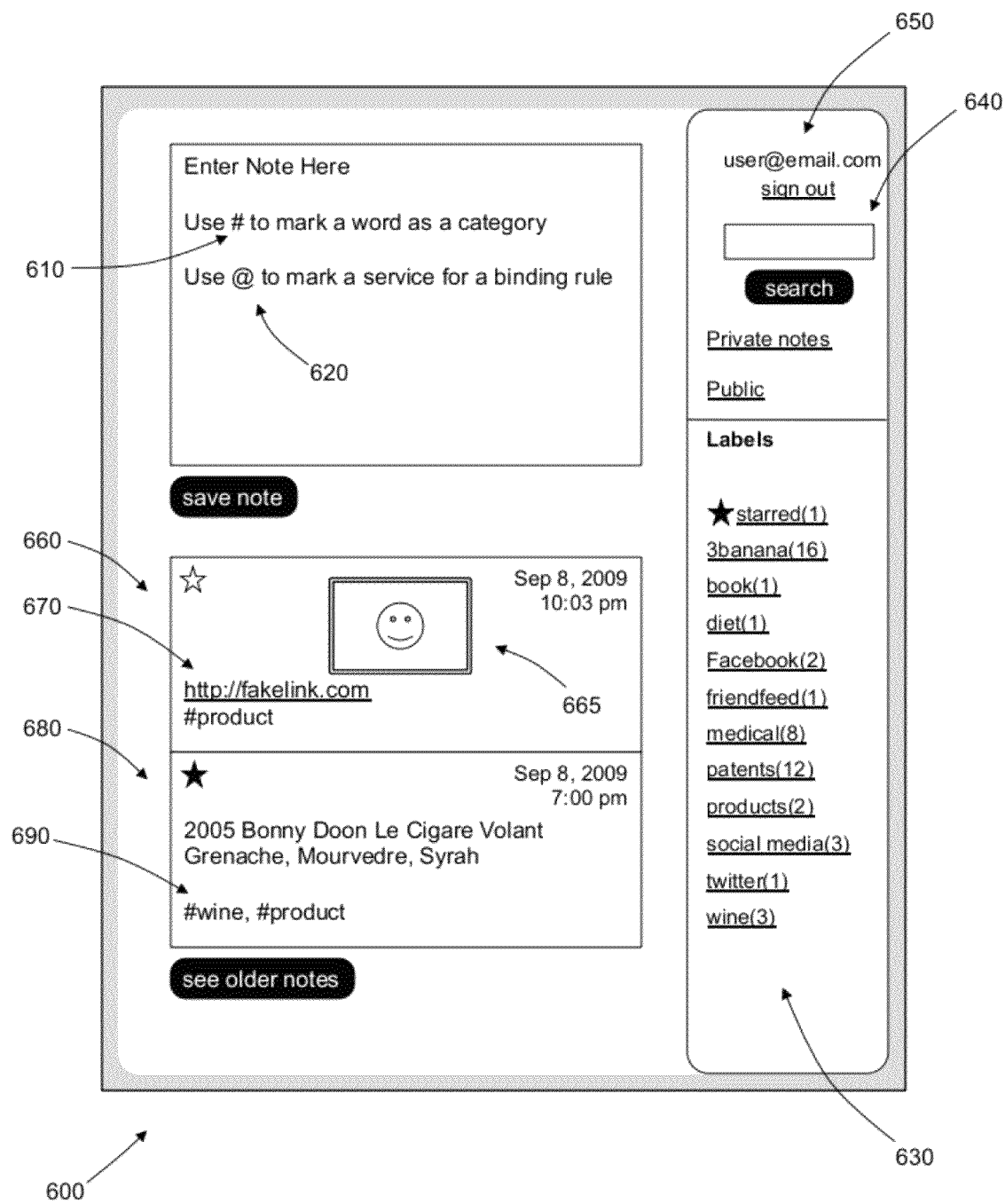
FIG. 6 shows an example user interface for semantic note taking according to the present invention.

FIG. 6 shows an example user interface 600 for user creation of a note and user entry of categories and binding rules for the note. In an embodiment, the user interface 600 is accessible via a web browser. However, alternative methods of accessing user interfaces known in the art may also be used. In a preferred embodiment, the user interface 600 allows user entry of a first symbol 610 to designate entry of a category and a second symbol 620 to designate entry of a binding rule. As shown in FIG. 6, the first symbol 610 is the "#" sign and categorization is accomplished by placing a "#" symbol adjacent to a word. Similarly, the second symbol 620 is the "@" sign to mark a service for a binding rule. The first 610 and second 620 symbols allow easy entry of categories and binding rules. As can be appreciated by one or ordinary skill in the art, the present invention is not limited to the use of symbols for categorization and binding rules.

In a preferred embodiment, entry of the first symbol 610 triggers a list of previously used categories to be displayed to the user. In particular, the list can be filtered to only include categories that may be relevant to the note, such as based on the content of the note or the context traits of the note. In an embodiment, users can override suggestions and label the note with non-suggested category or a new category. Similarly, entry of the second symbol 620 triggers a list of services or binding rules to be displayed to the user. In a preferred embodiment, user selection of a category to label the note triggers a display of suggested services where the note can be bound. Conversely, user selection of a binding rule triggers a display of suggested categories to label the note. The suggestions can be based on previously stored user selections, i.e. a user history, or any other bases as described herein with respect to the suggestion function.

The user interface 600 also includes a list of categories 630 used in all stored notes. A user can select a category from the list 630 to view notes labeled with the selected category. In an embodiment, a search box 640 is also available to find previously saved notes. FIG. 6 also shows previously saved notes 660 and 680. The note 660 includes a photo 665 and a weblink 670. The note 680 includes text description of a wine and is labeled 690 with the categories "wine" and "product" by use of the first symbol. The user interface 600 also includes a user name 650, such as the user's email address. In an embodiment, the application server requires a user authentication to access the semantic note taking system.

Embodiments of the present invention are also directed to user interfaces corresponding to services to facilitate simple collection of data and binding to services. In an embodiment, a user interface is provided for each of the services where a note can be bound. The user interface corresponding to a particular service includes one or more buttons for initiating an action specific to that service. Service specific user interfaces are referred to as semantic skins. In a preferred embodiment, a single click of a button on a semantic skin initiates the creation of a note, automatic content generation and addition to the note, automatic labeling of the note with one or more categories appropriate to the service, and communication of the note to the service.

Figure 7A:
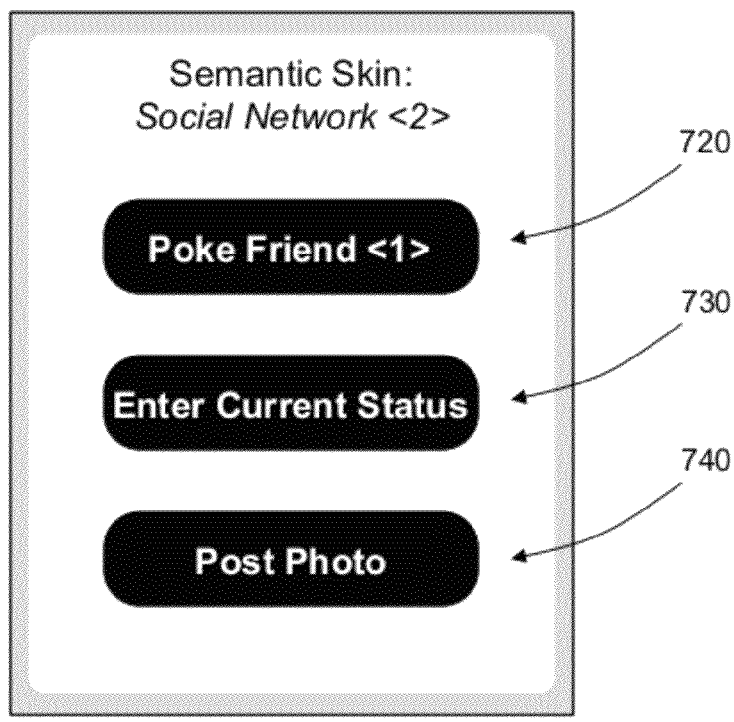
FIGS. 7A-B show examples of semantic skin user interfaces corresponding to services according to the present invention.
Figure 7B:
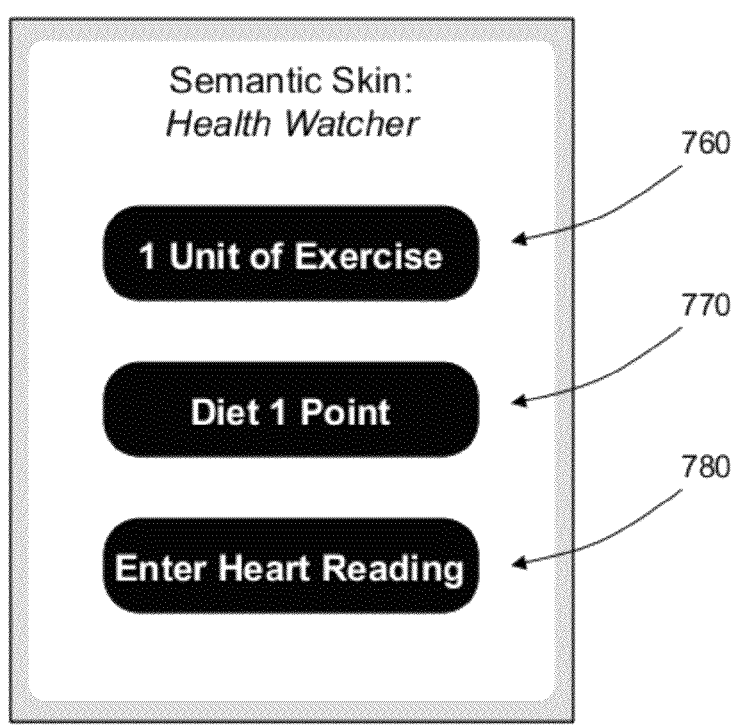

FIG. 7A shows an example of a semantic skin 710 for a social network service and FIG. 7B shows an example of a semantic skin 750 for a health or diet application. The semantic skin 710 includes a button 720 to "poke" a friend of the user in the social network, a button 730 to submit the current status of the user, and a button 740 to post a photo to the social network. The semantic skin 750 in the example shown by FIG. 7B includes a button 760 to enter exercise activity, a button 770 to enter diet information, and a button 780 to measure medical readings. The semantic skins can rely on context traits derived from the device where the data entry is performed. For example, the button 730 of semantic skin 710 can utilize the current location of the user as measured by the user device and publish that location to the social network. In another example, a user is operating a device that includes a heart monitor and the button 780 extracts heart rate measurements, attaches the measurements to a note, and communicates the note to a health service.

In a preferred embodiment, buttons in user interfaces and semantic skins are programmable. The buttons serve the purpose of providing simple or single click entry of data and minimizes the friction for a user to collect information and bind the information to services.

FIGS. 8-11 include details of a functional embodiment of the present invention. The exemplary embodiment shown in FIGS. 8-11 are directed to social network services, such as Facebook.com and Twitter.com, though its extension to other services can be appreciated by one of ordinary skill in the art. The present invention is not limited to the embodiment of FIGS. 8-11; alternatives to the services and applications described in FIGS. 8-11 can be identified by one of ordinary skill in the art.

Figure 8:
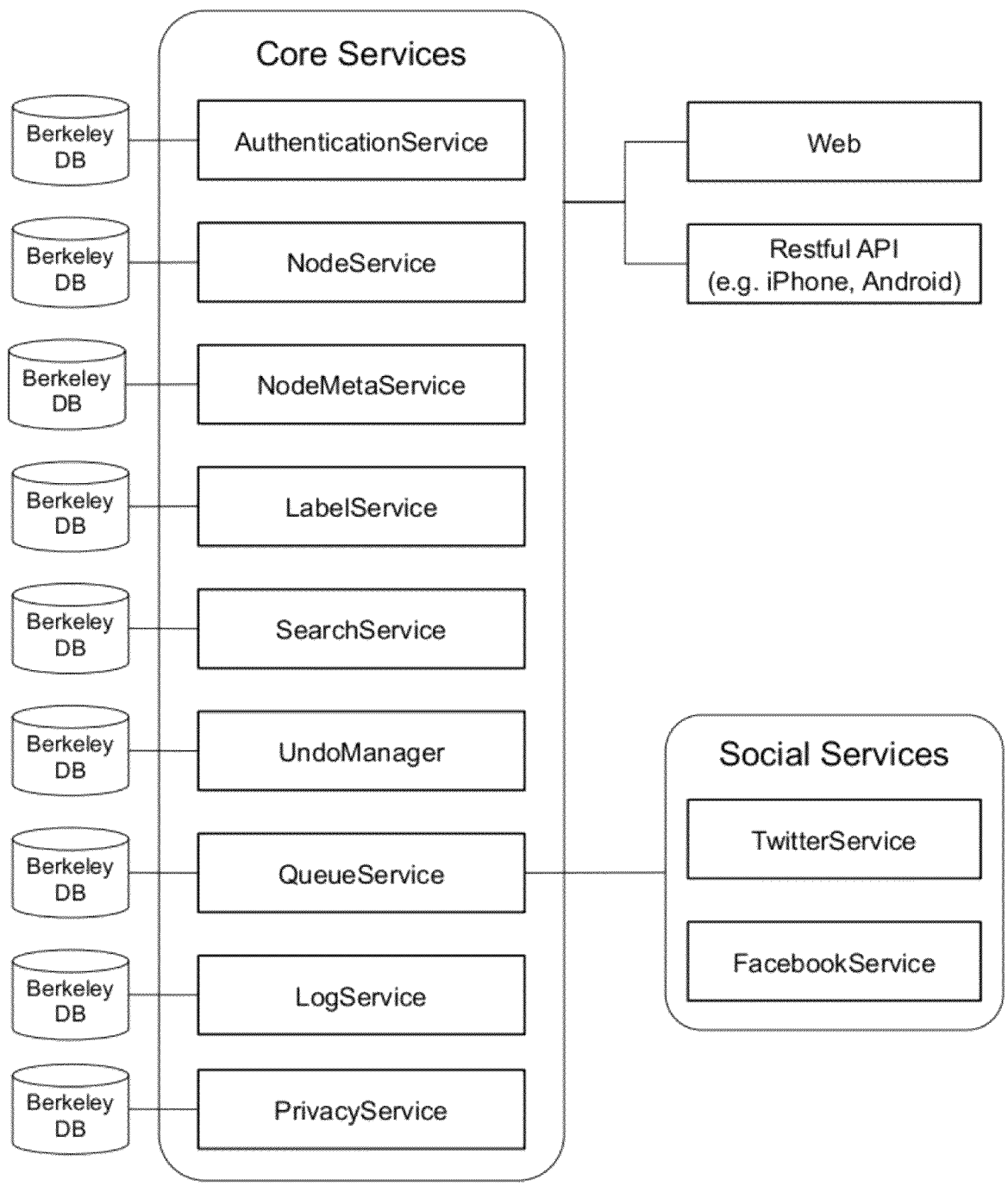
FIG. 8 shows the core services of an exemplary embodiment of the present invention.
Figure 9:
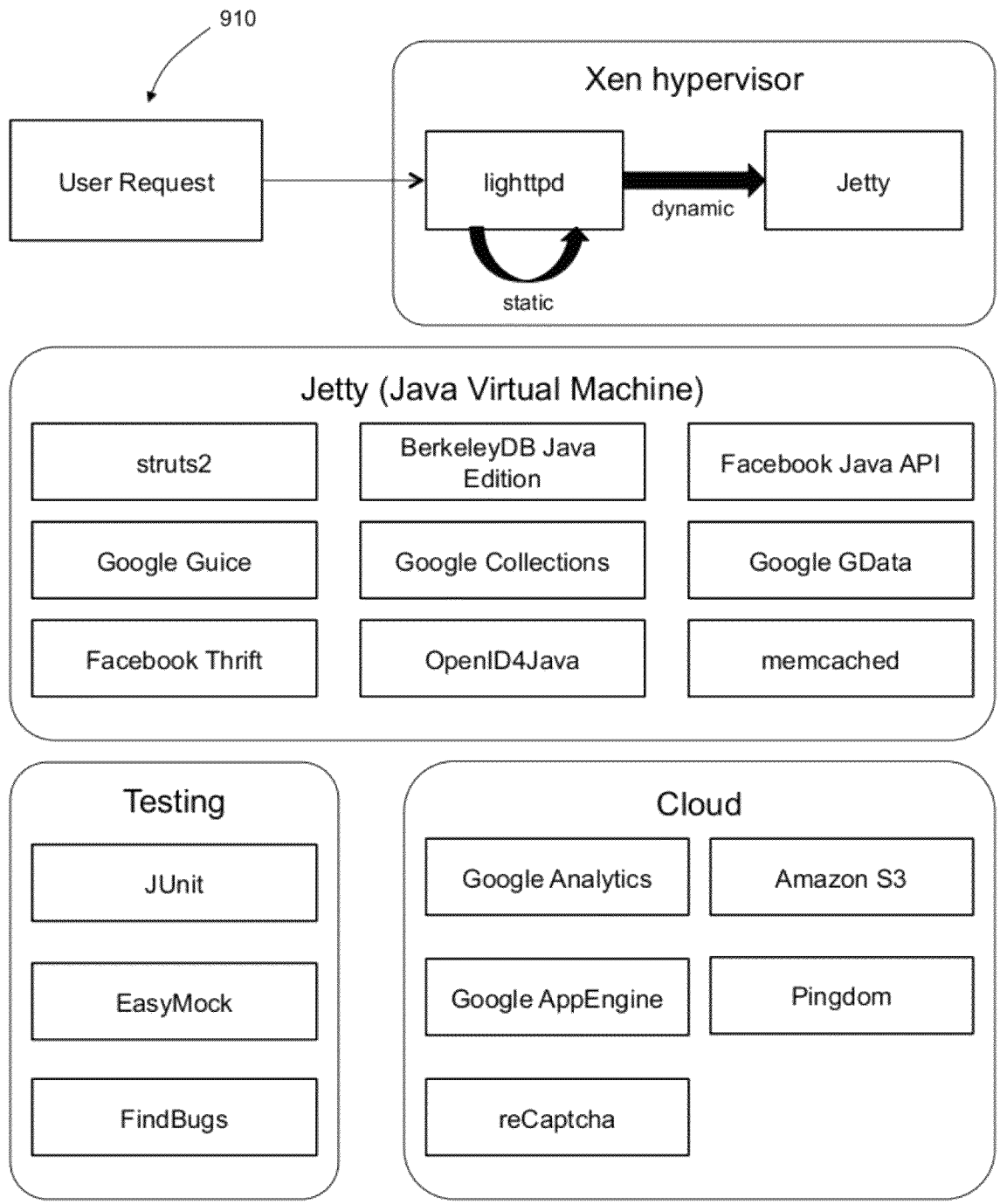
FIG. 9 shows the technology services underlying the core services shown in FIG. 8.

FIGS. 8-9 show the technologies used by the application server in an exemplary embodiment of the present invention. The core services are shown by FIG. 8 and include the AuthenticationService, NodeService, NodeMetaService, LabelService, SearchService, UndoManager, QueueService, LogService, and PrivacyService. Each of the core services has its own instance of a BerkeleyDB Java Edition as a backing store. FIG. 9 shows an initial user request 910 that is handled by a web server, e.g. lighttpd. Lighttpd serves up all the static content. If the request is for dynamic content then it is forwarded to the Jetty Java Application Server. Jetty runs inside of the Java Virtual Machine. In the embodiment shown in FIG. 9, the struts2 web framework is used inside of Jetty. Struts2 determines which services are needed to fulfill the request and uses Google Guice to create all the objects needed by the user. After all the objects have been created, struts2 fulfills the users request and generates the page. The jQuery JavaScript library is used to speed up and simplify cross-platform development. Google collections Library is used to augment the standard Java collections.

Figure 10:
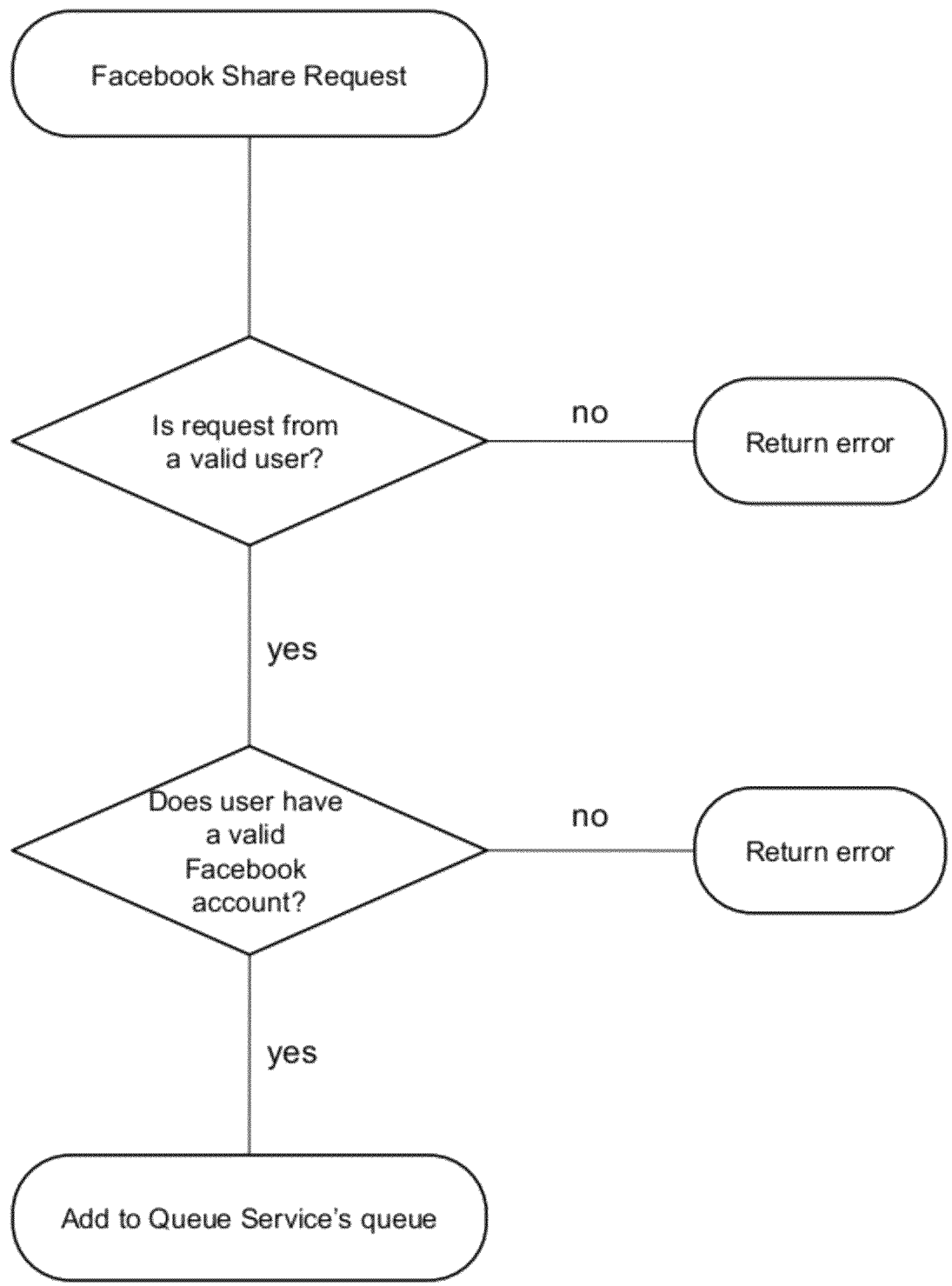
FIG. 10 shows a flow chart of an example login and authentication function in an exemplary embodiment of the present invention.

FIG. 10 shows a flow chart related to the AuthenticationService of an exemplary embodiment of the present invention. The AuthenticationService allows a user to communicate with any service that requires authentication or login information; thereby the semantic note taking system can be integrated with any number of third party applications and services. In the example shown in FIG. 10, a user request to share a note on Facebook is shown. The request is handled by struts2, which checks if the user is a valid user of the semantic note taking system. If the request is from a valid user, a request is sent to the FacebookService to verify if the user has valid Facebook credentials. If the user has a valid Facebook account, the request is sent to the QueueService to en-queue the Facebook share request.

Figure 11:
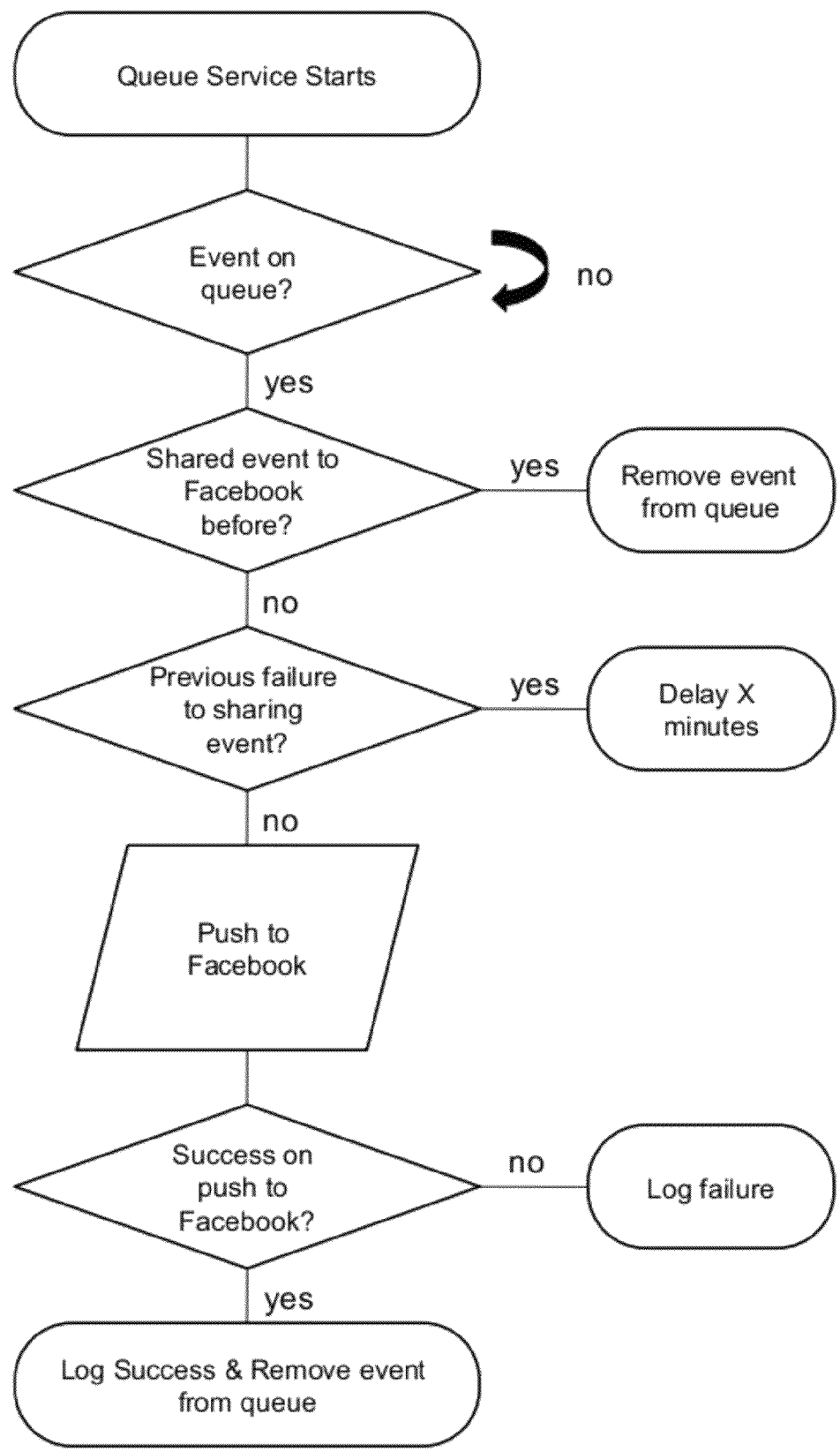
FIG. 11 shows a flow chart of an example Queue service in an exemplary embodiment of the present invention.

FIG. 11 shows a flow chart related to an embodiment of the QueueService. When an event is en-queued in the QueueService's queue, the QueueService checks if the note associated with that event has been previously shared to Facebook. The LogService tracks when a note has been successfully shared to Facebook. If the note has been previously successfully shared, it is removed from the queue. The QueueService then checks if there was a problem sharing the note. If the note has had a failure, the share event is timed out and put back in the queue to be run after X minutes. The note is then pushed to the user's Facebook account. The note is pushed by the QueueService calling the FacebookService to fulfill the share request. If the request succeeds, the event is removed from the QueueService's queue and logged to LogService.

EXAMPLES

The following examples demonstrate exemplary applications for the embodiments of the present invention. It is noted that applications for the present invention are not limited by these examples; other applications of the present invention can be identified by one of ordinary skill in the art.

Example 1

Product Review

A user enjoys a product, such as a glass of wine. During a dinner engagement The user jots down information related to the wine, such as the brand, vintage, variety, etc., by accessing a user interface to the semantic note taking system. The note includes a label of "#wine" for future reference to the note. Context traits, including the GPS coordinates where the note was created is associated with the note. Using the GPS coordinates and accessing a directory information module, the name of the restaurant is derived and automatically associated with the note. The note is saved in the database.

At a later date, the user chooses to discuss the wine with friends of the user who may be wine enthusiasts. By binding the wine review note to a social network or an email application, the note is communicated to one or more friends of the user. One of the friends writes a brief review of the wine and attaches that review to the note. After the note has been shared to friends of the user, the user decides to write a wine review to be posted on a wine website. The user refines the note and binds it to the wine review website to be published to the world.

Example 2

Retail

Figure 12A:
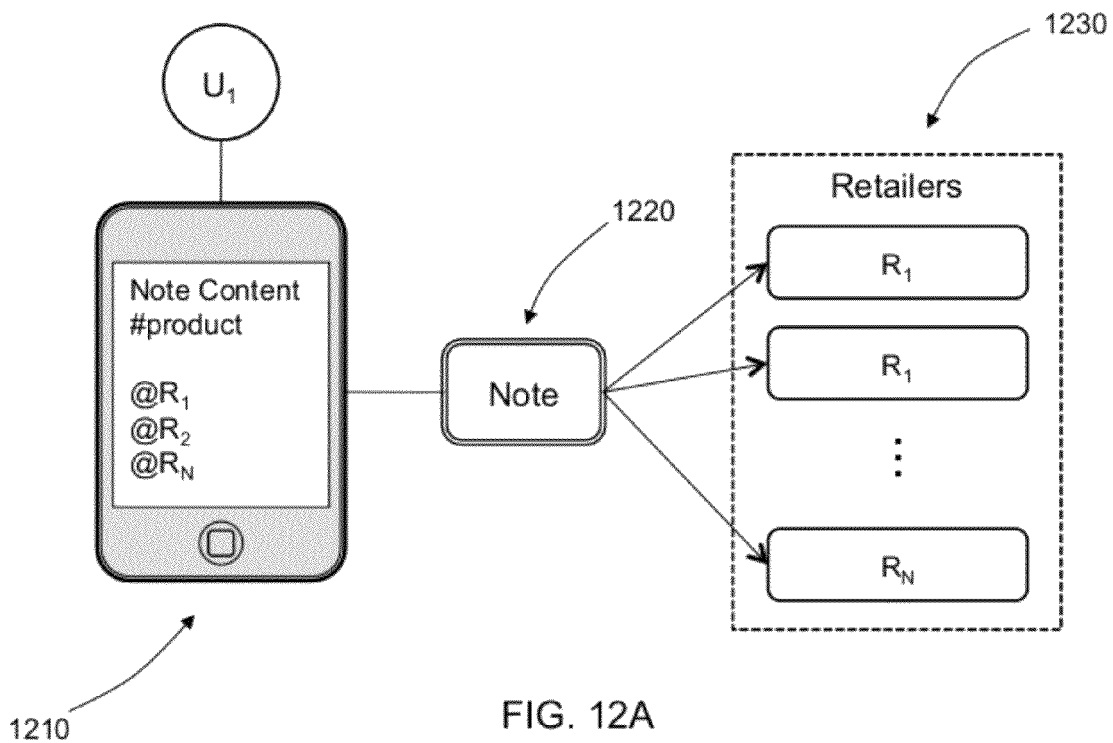
FIG. 12 shows an example of using semantic note taking with online retailers according to the present invention.
Figure 12B:
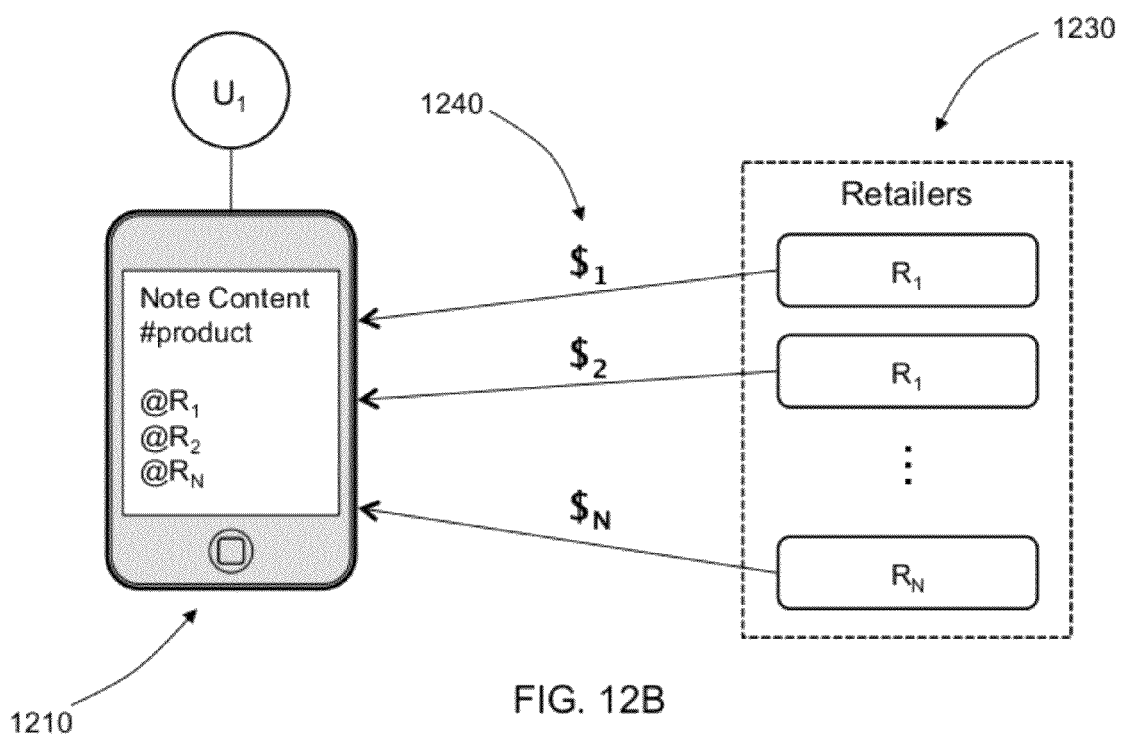

FIGS. 12A-B show an example of a retail application with bidding from multiple online retailers 1230. In FIG. 12A, user $U_1$ creates a note 1220 on a user device 1210. The note 1220 includes an identification of a product and binding rules that indicate it is to be bound to retailers $R_1$, $R_2$, and $R_N$. The note 1220 is communicated to the retailers $R_1$, $R_2$, and $R_N$ based on the binding rules. After the note 1220 is received by the retailers $R_1$, $R_2$, and $R_N$, the retailers send offers 1240 to user $U_1$ for the product described in the note 1220. Alternatively or additionally, the retailers $R_1$, $R_2$, and $R_N$ can send advertisements, coupons, or any information relating to the product to the user $U_1$.

Example 3

Health

The present invention can be directed to a dietary, health, or medical service. For example, with minimal friction, a user can submit his or her dietary behavior to be tracked by a diet service. In another example, medical information can be collected at a hospital visit or doctor's appointment and submitted to an electronic medical record (EMR) application.

Example 4

Research

The semantic note taking system of the present invention can also be applied to a research study. In an embodiment of the present invention, research data is collected in a note. The research data can be collected from the field via a mobile device. The research data is enriched with time and location context traits. For repetitive data collection, a semantic skin would provide simple one click user entry of data. For example, the present invention can facilitate frictionless data gathering from door-to-door surveys. A door-to-door surveyor would need not enter the address of each participant of the survey as location context traits would be automatically associated with the note. Relevant data (e.g. resident names and demographics) can be automatically accessed based on the location context traits,.

Lifestreams

Figure 13:
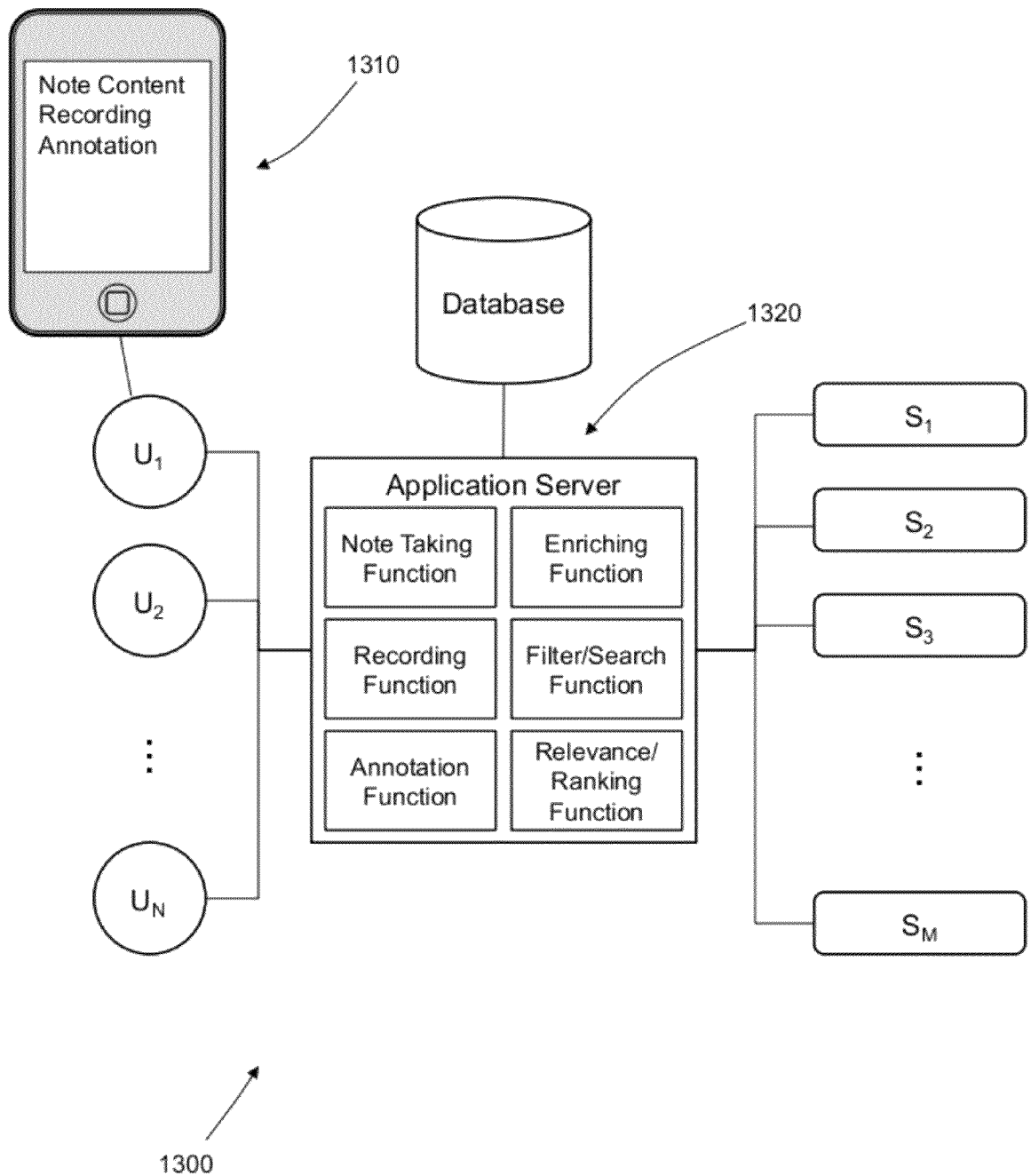
FIG. 13 shows an example of a system for collecting, enriching and linking information according to the present invention.
Figure 14:
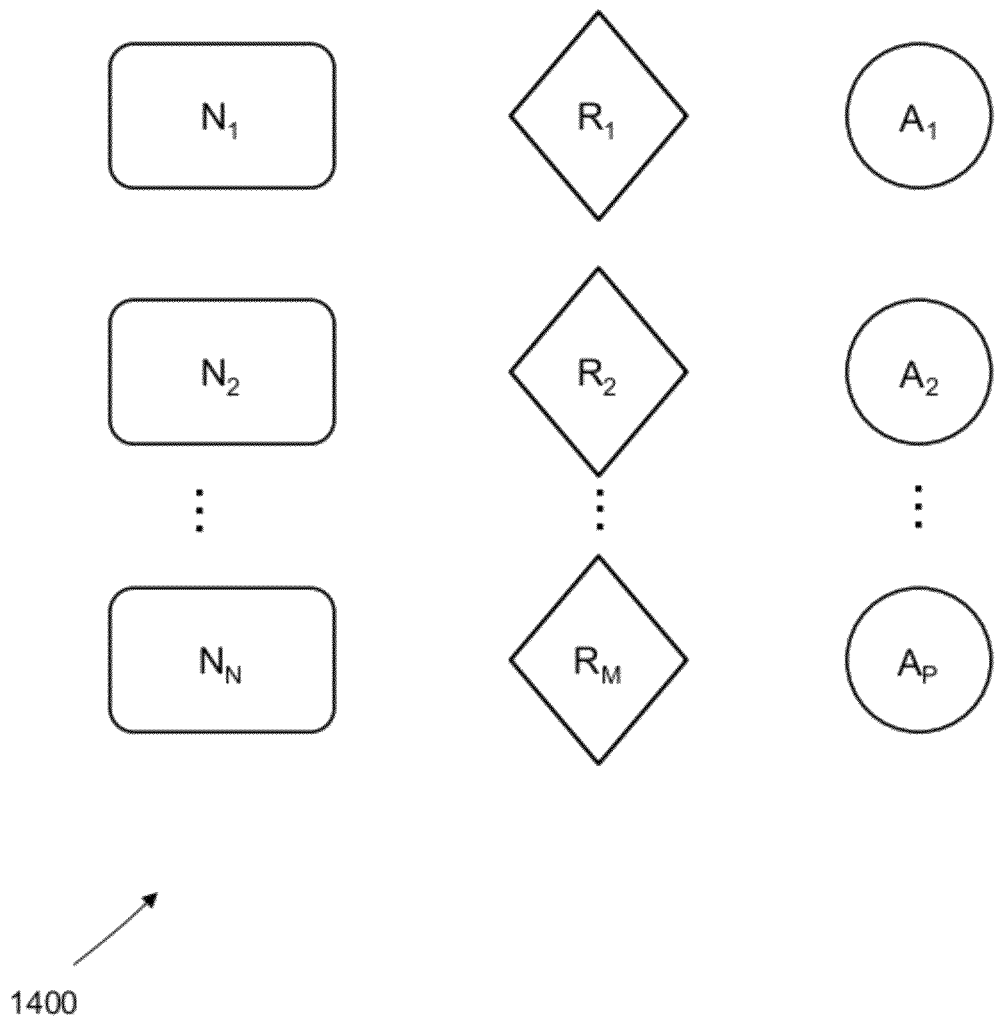
FIG. 14 shows an example of a plurality of notes $N_1, N_2 \ldots N_N$, recordings $R_1, R_2 \ldots R_M$, and annotation data elements $A_1, A_2 \ldots A_P$ according to the present invention.
Figure 15:
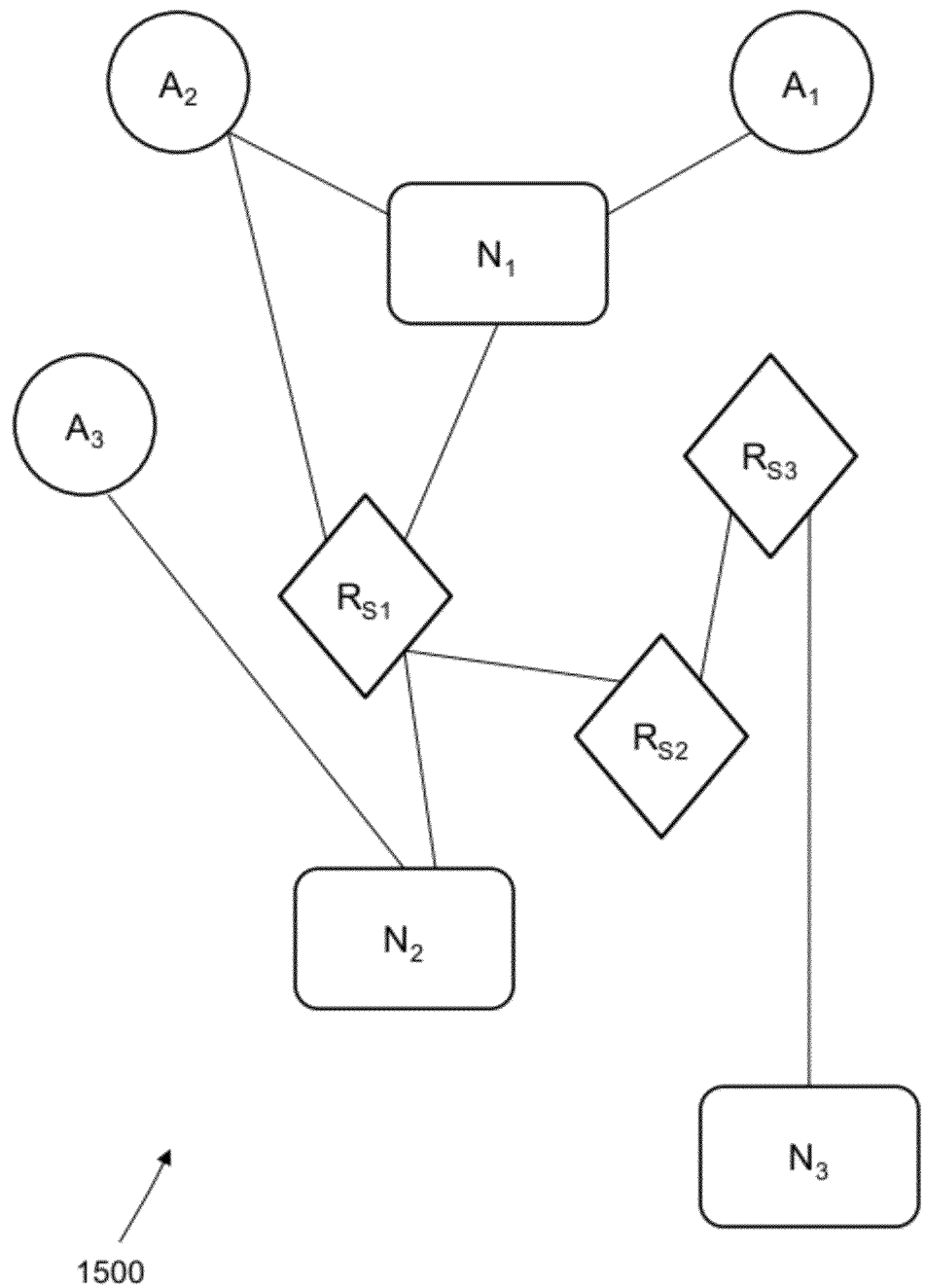
FIG. 15 shows an example of a linked network of enriched lifestreams of notes $N_1, N_2, N_3$, segments derived from recordings $R_{S1}, R_{S2}, R_{S3}$, and annotation data elements $A_1, A_2, A_3$, according to the present invention
Figure 16:
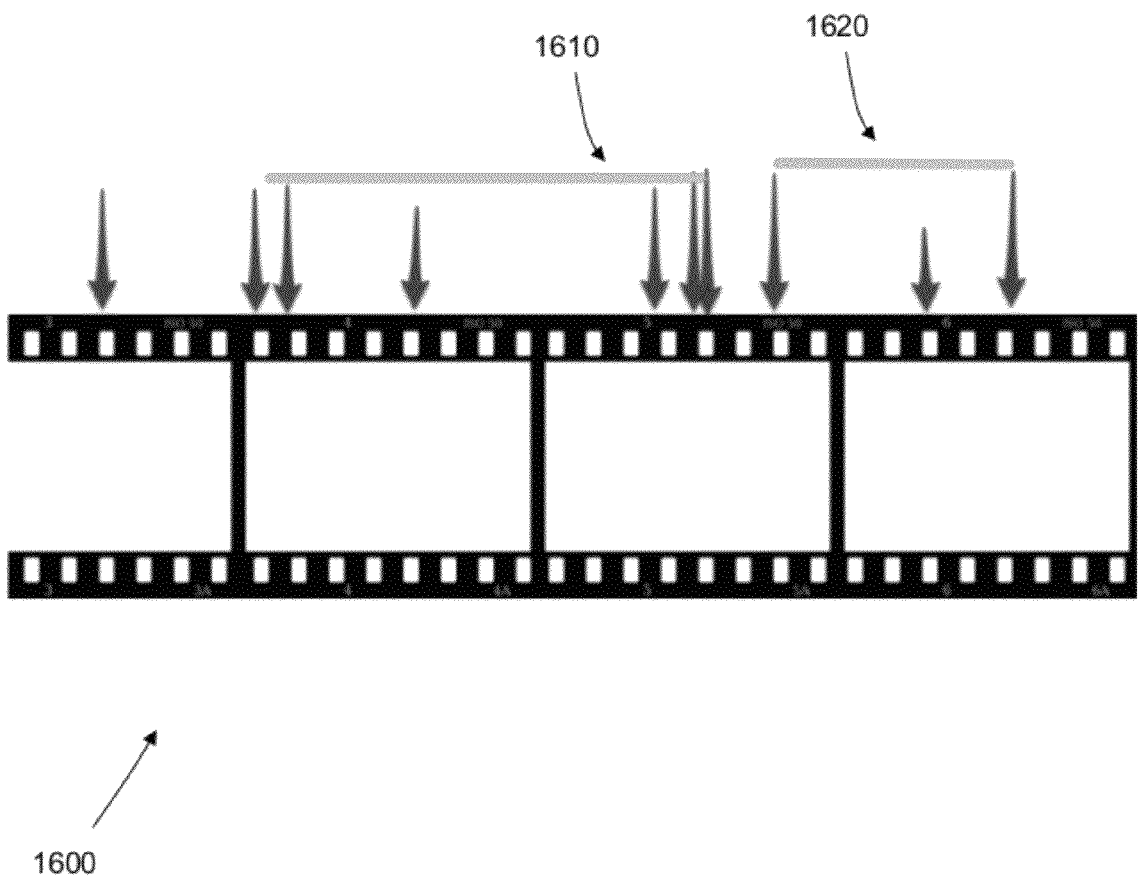
FIG. 16 shows an example of a recording 1600 in which segments 1610, 1620 are derived according to the present invention.
Figure 17:
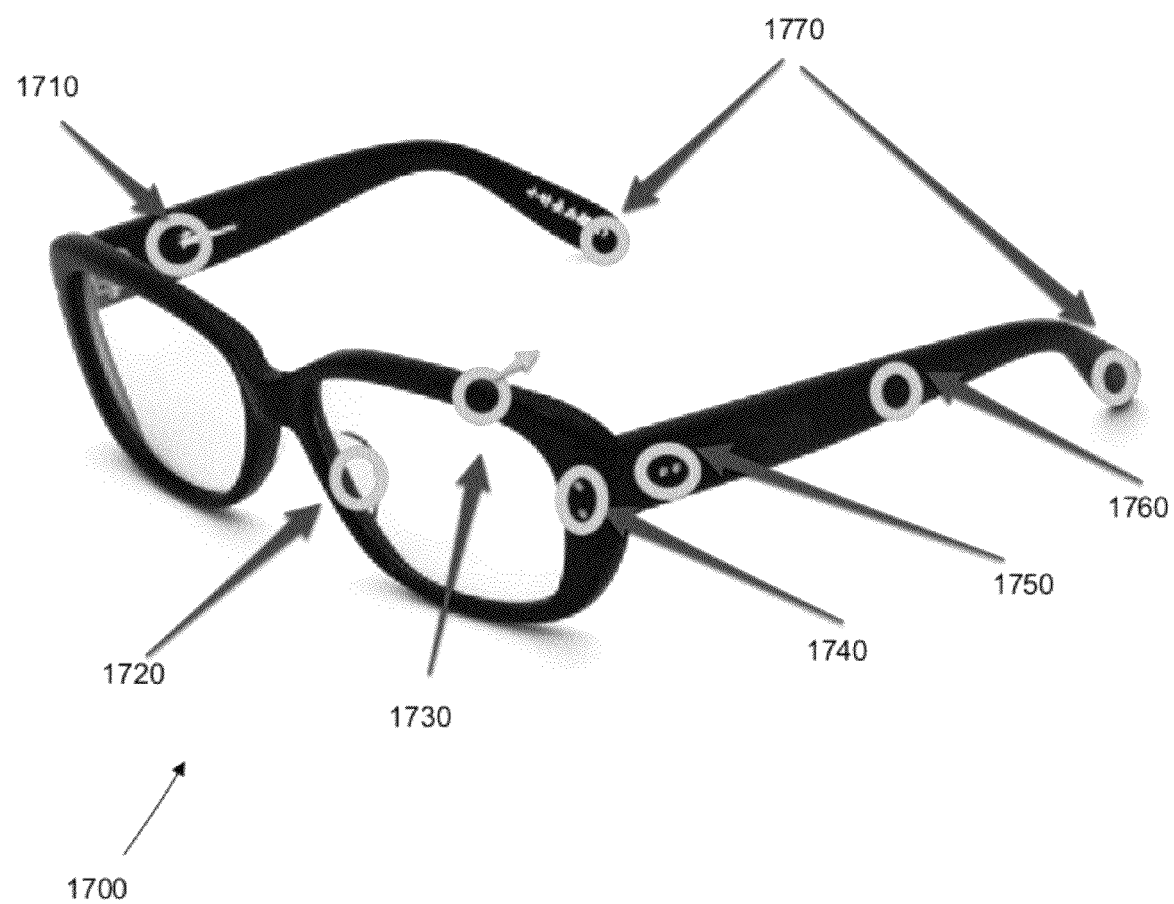
FIG. 17 shows an example of a data capture device 1700 according to the present invention, which is merely one example of the variety of possibilities. In this example 1710 pertains to sensing speaker and relative speaker position, 1720 pertains to measuring respiration patterns, 1730 pertains to measuring pupil dilation, blinking, tears, redness or the like, 1740 pertains to audio/video stream recording, 1750 pertains to location, direction, rotation, tilt, vibration or the like, 1760 pertains to smartphone transmission, and 1770 pertains to electrical stress and arousal measurements.

FIGS. 13-17 show an alternate embodiment which can be used in conjunction with one or more or the other teachings described herein or by itself as a method or system. FIG. 13 shows a preferred embodiment of a system 1300 for collecting information, enriching the collected information and linking the enriched information. System 1300 includes an application server 1320 that is accessible by a plurality of users $U_1$-$U_N$ each with their own computer device 1310 for performing a variety of functions encompassed in a so-called lifestream data function (similar as described with respect to FIG. 1). In one embodiment, lifestreams (or lifestream data)

contains notes $N_1, N_2 \ldots N_N$, recordings $R_1, R_2 \ldots R_M$ or segments of recordings $R_{S1}, R_{S2} \ldots R_{SM}$ and annotation data elements $A_1, A_2 \ldots A_P$, or any combination thereof (FIG. 14). More details about each of these elements is provided infra. The goal of the lifestream data functions is to ultimately enrich the individual data elements in each lifestream, which then form a network of enriched lifestreams or aspects of enriched lifestreams to provide a user with (a) a better organization of his/her data, notes, thoughts and intentions, (b) a better search or filter tool to search for data, notes, thoughts and intentions, and/or (c) a better ranking mechanism for ranking or determining relevance of data, notes, thoughts and intentions.

Examples of lifestream data functions, which can be embodied in any combination, are:

(i) a note taking function to allow the user to create a plurality of notes on a computer device. Notes can be text, audio media, visual media, audio-visual media, recorded data, a weblink, a pointer to an information source, or any combination thereof.

(ii) a recording function for collecting, recording or storing a plurality of recordings on a computer device. Examples of recordings are, in any combination, audio data recordings, video data recordings, or audio-video data recordings.

(iii) an annotation function for collecting, recording or storing a plurality of annotation data elements on a computer device. Examples of annotation data elements are externally sensed data of the environment of a user or physiological sensed data of a user. In both cases, the sensed data is either captured by the user or from the user using a data capture device (e.g. FIG. 17).

(iv) an enriching function for enriching each of the lifestreams and therewith creating a linked network 1500 of enriched lifestreams (FIG. 15), which are then available to the user on his/her computer device. Linking can be accomplished by, in any combination:

(j) linking one or more segments in each of the recordings with one or more annotation data elements, one or more notes, or a combination thereof, (jj) linking each of the notes with one or more annotation data elements, one or more segments of the recordings, or a combination thereof, or (jjj) linking each of the annotation data elements with one or more notes, one or more segments of the recordings, or a combination thereof.

Linking can be established by identifying commonalities in the data elements or can be guided by a set of preferences or user defined parameters.

(v) a filter or search function for filtering or searching the enriched lifestreams or aspects of the enriched lifestreams on the computer device.

(vi) a relevance function for determining relevance of the enriched lifestreams or aspects of the enriched lifestreams in the network of enriched lifestreams.

(vii) a ranking function for ranking of the enriched lifestreams or aspects of the enriched lifestreams in the network of enriched lifestreams.

According to a method of collecting information, enriching the information and linking the enriched information, a user of a computer device could be provided with a lifestream data function (encompassing some or all of the above functions in any combination) to allow a user to collect a plurality of lifestreams, enrich them and obtain a network of lifestreams or aspect of the lifestreams. Enriching can be handled either on the computer device, by a computer (application) server or an online service each of which is communicatively coupled with the computer device.

One or more segments in each recordings (e.g. 1600 in FIG. 16) can be identified by a start and finish generating for example segment 1610 and 1620. A segment in a recording can be automatically derived by a function running on a computer device, or by a computer or application server or by an online service. Specifically a segment can be derived using context sensing or sensing context changes in a recording, which then annotates the derived segment with its corresponding contextually sensed data. Examples of context sensing or sensing context changes is sensing information or changes related people, faces, location, direction, keywords, logical content blocks, or a combination thereof.

Externally sensed annotation data elements pertains for example to direction, location, identity of person or place the user is looking at. Facial recognition software, voice recognition software, GPS tracking software or devices, semantic analysis software, software for analysis of timing of events or speech, directional or motion analysis software, stress indicators or voice tone analysis software, intentional indicators or software (start, stop, etc.) or the like could be used for context sensing or changes in context. One or more externally sensed annotation data elements could be automatically derived by the computer device, the computer or application server or an online service based on context sensing or sensing changes in context in the externally sensed data.

Physiological sensed data of the user can be obtained using physiological sensors or biosensors. Examples of data derived are for example heart rate or heart rate variability, skin conductivity, brain activity, muscle action, respiration, voice tone, movement pattern, language use, or the like. Data capture devices or techniques are, for example, an electrocardiogram, electrodermogram, electroencephalogram, electromyogram, thermometer, photoplethysmogram, pneugraph, or the like (see also capture device of FIG. 17). One or more physiological sensed annotation data elements could be automatically derived by the computer device, the computer or application server or online service based on context sensing or sensing changes in the physiological sensed data.

Once the network of enriched lifestreams is established one could determine relevance of the enriched lifestreams or aspect of the enriched lifestreams by determining density of related connections in the network, or by determining any data elements that define or are part of the enriched lifestream data. This could for example be contextual information (e.g. people, places, business, social network, etc.), user-defined information or goals, or user intentions or emotions as they are defined in the streams. Relevance could be determined by the computer or application server or by the online service. Based on either automatically defined relevance the enriched lifestreams or aspects of the enriched lifestreams could be ranked and as such presented to the user on their computer device.

As one of ordinary skill in the art will appreciate, various changes, substitutions, and alterations could be made or otherwise implemented without departing from the principles of the present invention, e.g. notes can be communicated to any service capable of being connected to the network, and any network, such as a WAN or LAN, can be used in addition to or in replacement of the Internet. Accordingly, the scope of the invention should be determined by the following claims and their legal equivalents.

What is claimed is:

1. A method for collecting information, enriching said information and linking said enriched information, comprising:
   (a) on a computer device providing a lifestream data function to allow a user to collect a plurality of lifestreams, wherein said lifestream data function comprises:
      (i) a note taking function to allow said user to create a plurality of notes on said computer device,
      (ii) a recording function for collecting, recording or storing a plurality of recordings on said computer device, wherein said recordings are, in any combination, audio data recordings, video data recordings, or audio-video data recordings, and
      (iii) an annotation function for collecting, recording or storing a plurality of annotation data elements on said computer device, wherein said annotation data elements are externally sensed data of the environment of said user or physiological sensed data of said user, whereby said sensed data is either captured by said user or from said user using a data capture device;
   (b) on said computer device, or by a computer server or an online service each of them communicatively coupled with said computer device enriching each of said lifestreams and therewith creating a linked network of enriched lifestreams available to said user on said computer device by, in any combination:
      (j) linking one or more segments in each of said recordings with one or more annotation data elements, one or more notes, or a combination thereof,
      (jj) linking each of said notes with one or more annotation data elements, one or more segments of said recordings, or a combination thereof, or
      (jjj) linking each of said annotation data elements with one or more notes, one or more segments of said recordings, or a combination thereof; and
   (c) said computer device providing a filter or search function to said user for filtering or searching said enriched lifestreams or aspects of said enriched lifestreams on said computer device.

2. The method as set forth in claim 1, wherein each of said notes comprise text, audio media, visual media, audio-visual media, recorded data, a weblink, a pointer to an information source, or any combination thereof.

3. The method as set forth in claim 1, wherein said one or more segments in each of said recordings are automatically derived by said computer device, said computer server or said online service based on context sensing or sensing changes in context in said recordings which annotates said derived segment with its corresponding contextually sensed data.

4. The method as set forth in claim 3, wherein said context sensing or sensing changes in context is sensing information or changes related people, faces, location, direction, keywords, logical content blocks, or a combination thereof.

5. The method as set forth in claim 1, wherein said externally sensed annotation data elements pertains to direction, location, identity of person or place said user is looking at.

6. The method as set forth in claim 5, wherein said one or more externally sensed annotation data elements are automatically derived by said computer device, said computer server or said online service based on context sensing or sensing changes in context in said externally sensed data.

7. The method as set forth in claim 1, wherein said physiological sensed data of said user is obtained using physiological sensors or biosensors.

8. The method as set forth in claim 7, wherein said one or more physiological sensed annotation data elements are automatically derived by said computer device, said computer server or said online service based on context sensing or sensing changes in said physiological sensed data.

9. The method as set forth in claim 1, further comprising on said computer device, by said computer server or by said online service determining relevance of said enriched lifestreams or aspects of said enriched lifestreams in said network of enriched lifestreams.

10. The method as set forth in claim 1, further comprising on said computer device, by said computer server or by said online service ranking of said enriched lifestreams or aspects of said enriched lifestreams in said network of enriched lifestreams.

11. A system for collection information, enriching the information, and linking the said enriched information, comprising:
   (a) an application server, wherein a plurality of users are communicatively connected to said application server to create a plurality of lifestreams; and
   (b) a database for storing said lifestreams created by said users,
   wherein said application server operates a plurality of lifestream data functions, said functions comprising:
      (i) a note taking function to allow said user to create a plurality of notes on a computer device,
      (ii) a recording function for collecting, recording or storing a plurality of recordings on said computer device, wherein said recordings are, in any combination, audio data recordings, video data recordings, or audio-video data recordings,
      (iii) an annotation function for collecting, recording or storing a plurality of annotation data elements on said computer device, wherein said annotation data elements are externally sensed data of the environment of said user or physiological sensed data of said user, whereby said sensed data is either captured by said user or from said user using a data capture device,
      (iv) an enriching function for enriching each of said lifestreams and therewith creating a linked network of enriched lifestreams available to said user on said computer device by, in any combination:
         (j) linking one or more segments in each of said recordings with one or more annotation data elements, one or more notes, or a combination thereof,
         (jj) linking each of said notes with one or more annotation data elements, one or more segments of said recordings, or a combination thereof, or
         (jjj) linking each of said annotation data elements with one or more notes, one or more segments of said recordings, or a combination thereof; and
      (v) a filter or search function for filtering or searching said enriched lifestreams or aspects of said enriched lifestreams on said computer device.

12. The system as set forth in claim 11, wherein each of said notes comprise text, audio media, visual media, audio-visual media, recorded data, a weblink, a pointer to an information source, or any combination thereof.

13. The system as set forth in claim 11, wherein said one or more segments in each of said recordings are automatically derived by said computer device, said application server or an online service based on context sensing or sensing changes in context in said recordings which annotates said derived segment with its corresponding contextually sensed data.

14. The system as set forth in claim 13, wherein said context sensing or sensing changes in context is sensing information or changes related people, faces, location, direction, keywords, logical content blocks, or a combination thereof.

15. The system as set forth in claim 11, wherein said externally sensed annotation data elements pertains to direction, location, identity of person or place said user is looking at.

16. The system as set forth in claim 15, wherein said one or more externally sensed annotation data elements are automatically derived by said computer device, said application server or an online service based on context sensing or sensing changes in context in said externally sensed data.

17. The system as set forth in claim 11, wherein said physiological sensed data of said user is obtained using physiological sensors or biosensors.

18. The method as set forth in claim 17, wherein said one or more physiological sensed annotation data elements are automatically derived by said computer device, said application server or an online service based on context sensing or sensing changes in said physiological sensed data.

19. The system as set forth in claim 11, further comprising on said computer device, by said application server or by an online service determining relevance of said enriched lifestreams or aspects of said enriched lifestreams in said network of enriched lifestreams.

20. The system as set forth in claim 11, further comprising on said computer device, by said application server or by an online service ranking of said enriched lifestreams or aspects of said enriched lifestreams in said network of enriched lifestreams.

\* \* \* \* \*